March 23, 1926.
R. KRENZ
ANTISQUEAK WEB
1,577,582
Filed Nov. 7, 1925   3 Sheets-Sheet 1
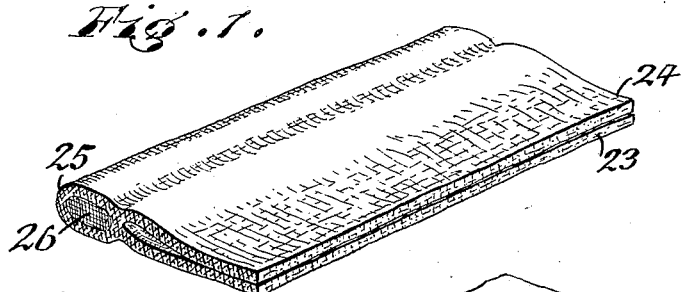
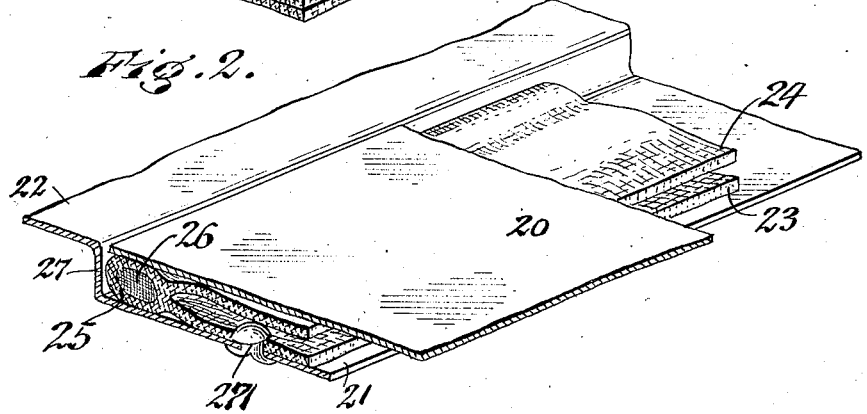
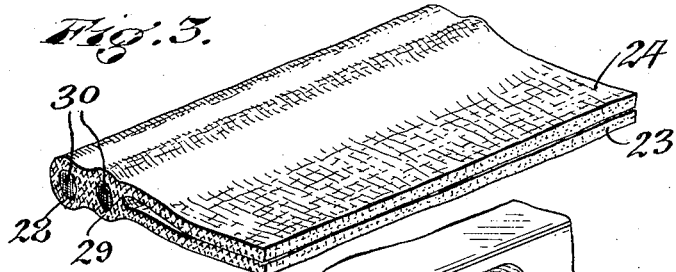
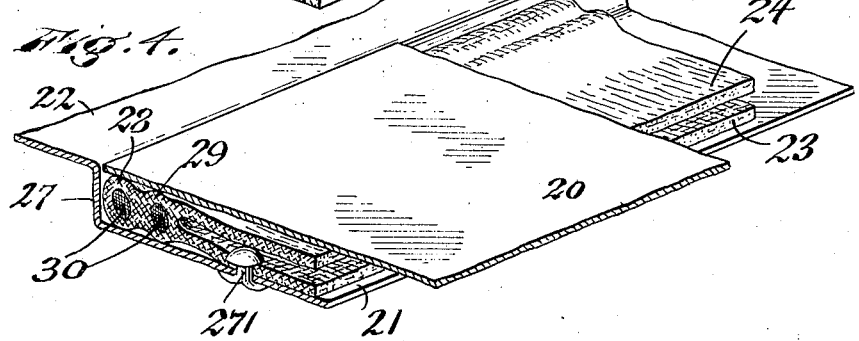

March 23, 1926. 1,577,582
R. KRENZ
ANTISQUEAK WEB
Filed Nov. 7, 1925 3 Sheets-Sheet 2
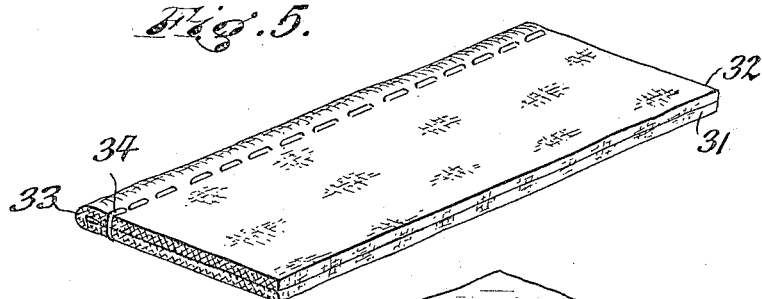
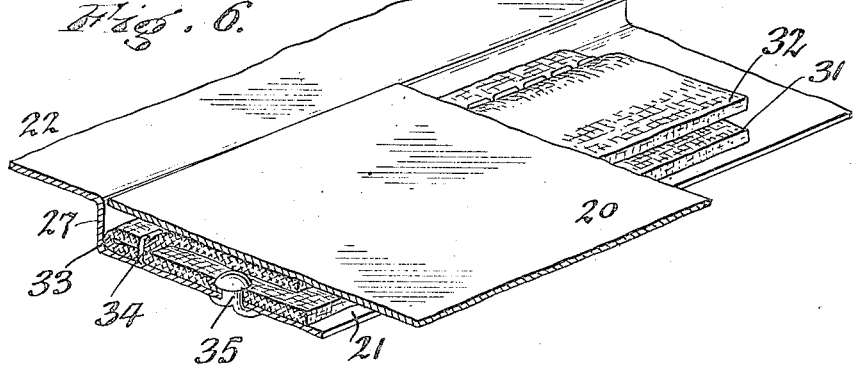
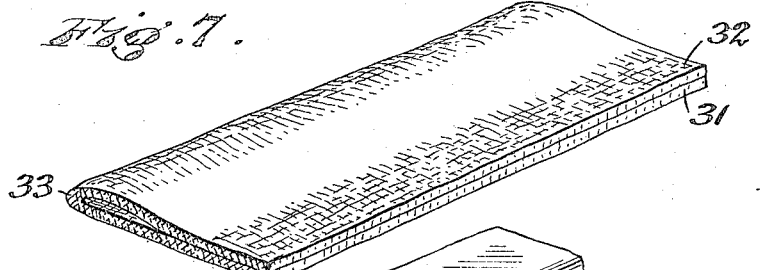
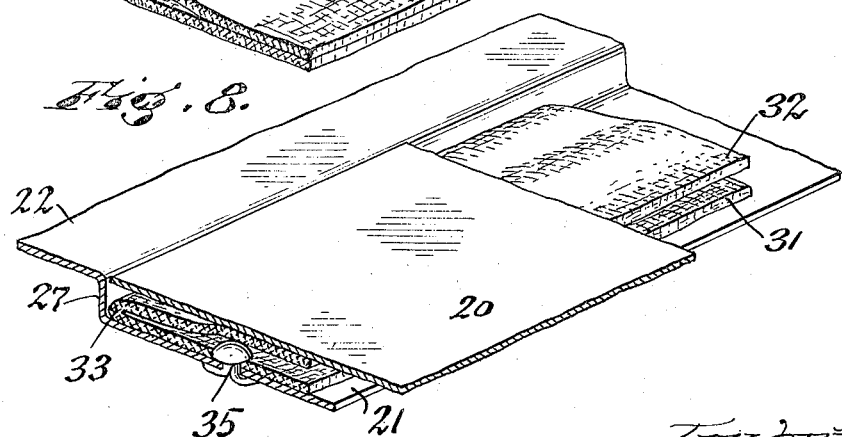

March 23, 1926.
R. KRENZ
ANTISQUEAK WEB
Filed Nov. 7, 1925
1,577,582
3 Sheets-Sheet 3
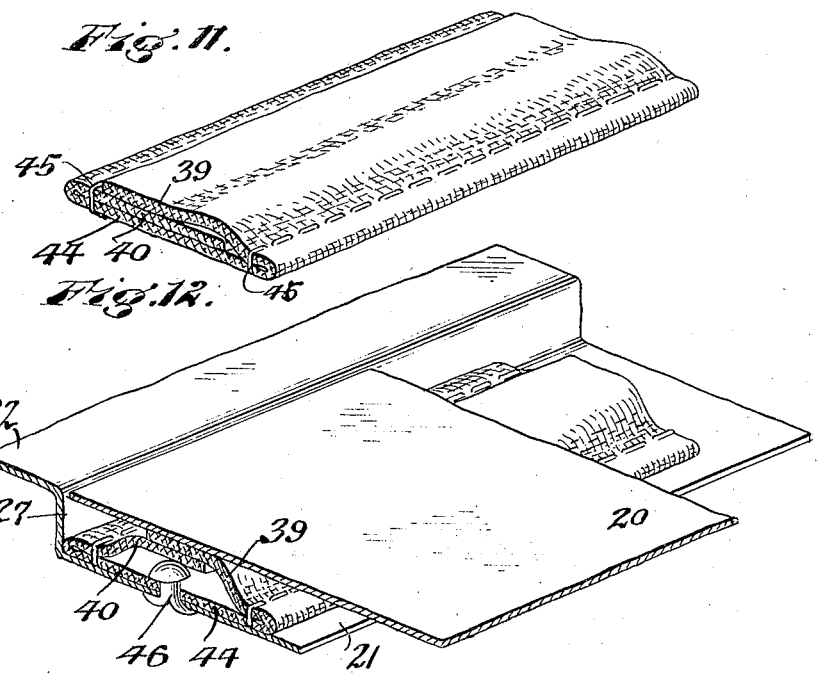
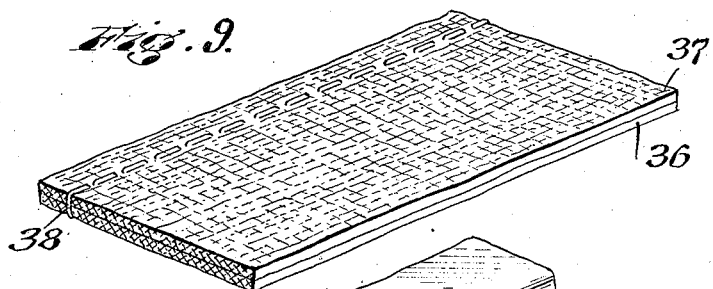
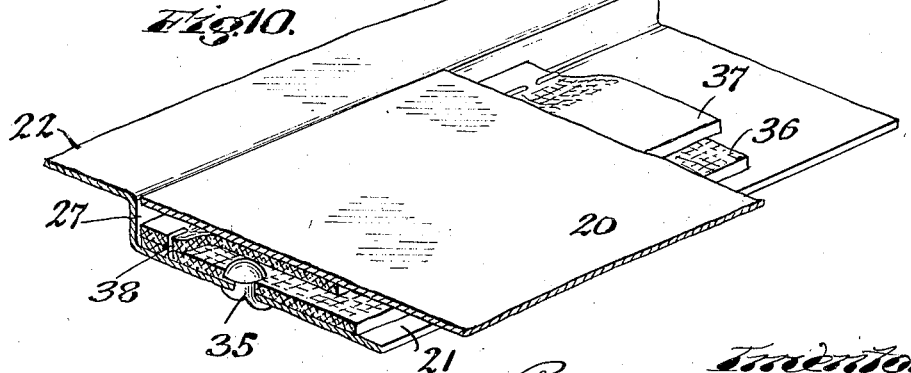

Patented Mar. 23, 1926.

1,577,582

UNITED STATES PATENT OFFICE.

RUDOLPH KRENZ, OF BUFFALO, NEW YORK, ASSIGNOR TO BUFFALO WEAVING AND BELTING CO., OF BUFFALO, NEW YORK, A CORPORATION OF NEW YORK.

ANTISQUEAK WEB.

Application filed November 7, 1925. Serial No. 67,506.

*To all whom it may concern:*

Be it known that I, RUDOLPH KRENZ, a citizen of the United States, residing at Buffalo, in the county of Erie and State of New York, have invented new and useful Improvements in Antisqueak Webs, of which the following is a specification.

This invention relates to an anti-squeak web which is more particularly intended for use between opposing metal parts of automobiles, as for example between the sections of the engine hood and the cowl and radiator, or between the body and frame.

Heretofore ordinary flat woven webbing has been used for this purpose but this is unsatisfactory inasmuch as the fastenings such as the heads of the rivets which secure the webbing to the cowl and radiator are often not driven tight enough to cause their heads to sink into the webbing, thus leaving them exposed so that the hood sections engage the fastenings or rivet heads and produce a squeaky and rattling noise when the car vibrates while in operation.

It is the object of this invention to provide an anti-squeak web which can be readily and quickly applied to the cowl, radiator or other part of the automobile and positively support an opposing part of the automobile out of contact with the rivets or fastenings so that the absence of squeaks and rattling noise is assured.

In the accompanying drawings:

Figure 1 is a fragmentary perspective view of one form of anti-squeak web embodying my invention before the same is applied to the opposing metal parts of an automobile.

Figure 2 is a similar view showing the same applied between the hood and the radiator or cowl of an automobile.

Figure 3 is a view similar to Fig. 1 showing a modified form of web containing my improvements before it is applied to an automobile.

Figure 4 is a similar view showing the last mentioned form of web applied to an automobile.

Figure 5 is a perspective view of another modified form of web containing my invention.

Figure 6 is a perspective view of the last mentioned web mounted on an automobile.

Figure 7 is a perspective view of another form of web containing my invention.

Figure 8 is a similar view showing the same built into an automobile.

Figure 9 is a perspective view of still another form of my improved web.

Figure 10 is a similar view of the last mentioned web mounted on an automobile.

Figure 11 is a perspective view showing a further form of web embodying my improvements.

Figure 12 is a similar view showing the last mentioned form of web installed on an automobile.

In the following description similar characters of reference indicate like parts in the several figures of the drawings:

Although this anti-squeak web may be installed in various places on an automobile where two metal parts are to be held apart so that the same cannot come in contact with each other and produce squeaking or rattling, the drawing, for example, in the present case shows such a web arranged between a sheet metal lid or cover section 20 of an engine hood and the depressed or inwardly off-set rest or support 21 of an adjacent sheet metal body 22 of the radiator or cowl.

In the form of my improved anti-squeak web shown in Figs. 1 and 2 the same comprises two comparatively thin superposed strips 23, 24 of woven fabric and a comparatively thick bead or rib connecting one pair corresponding longitudinal edges of said strips and consisting of a single longitudinal tube 25 woven intergrally with said strips, and a core 26 of fibrous material arranged within the tube so as to hold the same yieldingly in a distented condition.

This web is placed flatwise with the lower strip 23 lying on the rest or support 21 and secured thereto by rivets 271 or other fastenings and the bead next to the shoulder 27 between the rest and the body, while the upper strip 24 overhangs the heads of the rivets or fastenings, and the lid or cover section 20 rests in its closed position on the bead and is prevented by the interposed upper strip 24 from coming accidentally in contact with the heads of the fastening rivets, as shown in Fig. 2. The lower strip of the web is secured to the rest of the hood by means of the rivets while the upper strip is turned back and out of the way sufficiently to enable the rivets to be applied to the lower strip and the hood rest.

When a strip of this character is mounted on the hood rest in this manner the lid or cover section when closed rests on the thickened bead of the web and is held out of engagement with the rivet heads so that squeaking or rattling noise is positively eliminated.

Instead of producing the thickened bead on corresponding longitudinal edges of the strips by one cored tube, as shown in Figs. 1 and 2, the same effect can be produced by weaving two tubes 28, 29, side by side lengthwise of the web and providing these tubes with fibrous or resilient cores 30, as shown in Figs. 3 and 4.

Another form in which my invention may be carried into effect consists in weaving the web with two integral superposed strips 31, 32 which are connected at one of their corresponding longitudinal edges by a turn 33 which latter is retained in position by a longitudinal row of stitches 34, as shown in Figs. 5 and 6. The lower strip 31 of this web is attached to the hood rest by rivets 35 and the latter are covered by the upper strip 32, whereby the lid or cover resting on the upper strip is supported but prevented from contacting with the rivets or fastenings and making a squeaking or rattling noise.

If desired the stitches 34 may be omitted from the web, as shown in Figs. 7 and 8, in which case the turn of fold is creased so as to cause the strips to stay in place one above the other.

Instead of making the web in one piece the same may be constructed of two separate lower and upper strips 36, 37 which are connected at one pair of corresponding longitudinal edges by a row of stitches 38, as shown in Figs. 9 and 10.

If desired the upper strip of the web may be made in the form of two flaps, sections or flanges 39, 40 which project toward each other from opposite longitudinal edges of the lower strip 44 and are held in this folded position by stitches 45 passing through the outer edges of the top strip sections 39, 40 and the adjacent longitudinal edge portions of the lower strip 44, as shown in Fig. 11. This form of web is held in place by rivets 46 passing through the lower strip and the hood rest 21 and after this web has been thus attached to the rest the inner edge portions of the upper strip sections overlap each other and overhang the heads of the fastening rivets, as shown in Fig. 12, thereby forming a cushioned seat for the lid or cover section and preventing the latter from coming into contact with the rivets and producing a squeaking or rattling noise when the car is in operation.

In each of the several forms of my invention shown and described the web has superposed strips which are connected at corresponding longitudinal edges, the lower strip is attached to one metal part, and the upper strip overhangs the fastening and prevents the other metal part from engaging therewith and thereby avoids the objectionable action heretofore mentioned.

This web is simple in construction, it can be made economically and it can be readily applied to cars of standard make.

I claim as my invention:

1. An anti-squeak web adapted to be arranged between opposing metal parts of an automobile, comprising superposed strips connected at corresponding longitudinal edges, one of said strips adapted to be connected by a fastening to one of said metal parts and the other strip adapted to overhang said fastening and prevent contact of the other metal part therewith.

2. An anti-squeak web adapted to be arranged between opposing metal parts of an automobile, comprising comparatively thin superposed strips one of which is adapted to be connected by a fastening to one of said metal parts and the other strip being adapted to overhang said fastening and prevent contact of the other metal part therewith, and a comparatively thick bead connected with corresponding longitudinal edges of said strips.

3. An anti-squeak web adapted to be arranged between opposing metal parts of an automobile, comprising comparatively thin superposed strips one of which is adapted to be connected by a fastening to one of said metal parts and the other strip being adapted to overhang said fastening and prevent contact of the other metal part therewith, and a comparatively thick bead connected with corresponding longitudinal edges of said strips and consisting of a tube woven integrally with said strips, and a fibrous core arranged within said tube.

RUDOLPH KRENZ.